April 10, 1956 D. L. COTTLE 2,741,632
SEPARATION OF ESTERS
Filed Aug. 18, 1951
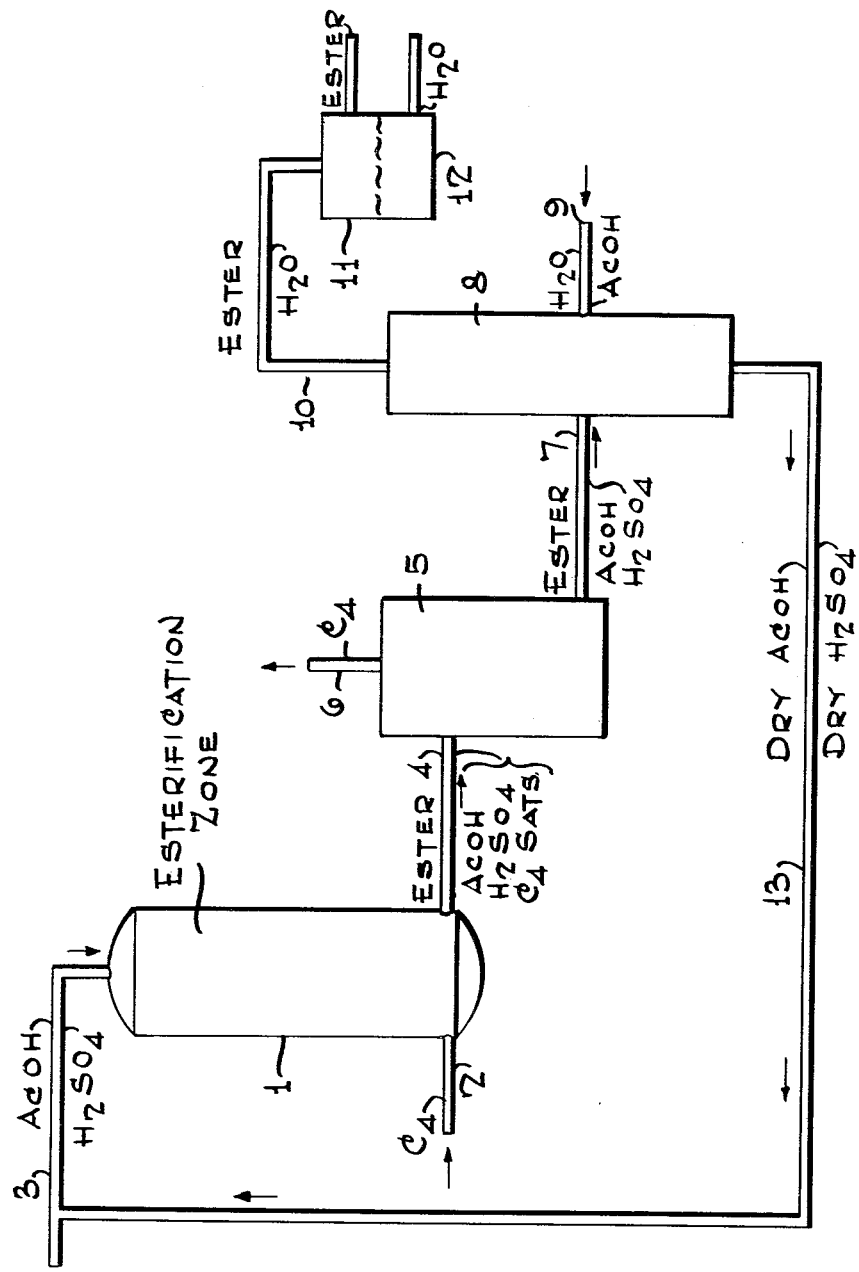
Delmer L. Cottle Inventor
By Henry Berk Attorney

United States Patent Office 2,741,632
Patented Apr. 10, 1956

2,741,632

SEPARATION OF ESTERS

Delmer L. Cottle, Highland Park, N. J., assignor to Esso Research and Engineering Company, a corporation of Delaware Application August 18, 1951, Serial No. 242,486

2 Claims. (Cl. 260—499)

This invention relates to a novel method of separating esters in a mixture prepared by the esterification of olefins with monocarboxylic acids in the presence of a sulfuric acid catalyst.

The esterification of olefins with monocarboxylic acids utilizing sulfuric acid as a catalyst is well known in the art (see, for example, U. S. Patent No. 2,006,734). Olefinic material, preferably in the liquid phase, is introduced into a reaction unit where it is brought into intimate contact with an organic acid and catalyst by agitation, for example, or by other dispersing means.

The isolation of esters formed from alcohols and organic acids is a simple process, largely because the amount of sulfuric acid used as catalyst is too small a concentration to materially damage the product during its separation.

The same is not true of processes in which olefins are directly esterified with organic acids.

Whereas the alcohol process for esters may use about one wt. per cent sulfuric acid catalyst, a direct olefin esterification process uses up to 10 wt. per cent sulfuric based on acetic acid alone and a minimum of about 5%. Thus the final reaction mixture to be separated comprises principally ester, sulfuric acid, and carboxylic acid. The separation of the esters is complicated by the fact that the concentration of sulfuric acid is high enough to catalyze decomposition of the esters, a problem not encountered in alcohol esterification processes. That this problem is recognized can be seen from the article in "Industrial Engineering Chemistry," January 1938, page 57, which states: "The final step of the process is the isolation . . . of the ester in a salable form and the unreacted acid in condition for reuse. Direct distillation of the material is generally unsatisfactory because the small amount of sulfuric acid present concentrates along with the ester as the hydrocarbon is removed and promotes decomposition." The conditions mentioned in this article are those obtained after the bulk of the sulfuric acid has been separated in the lower layer of a two-phase system. Thus the problem is even more marked in a homogeneous product system comprising principally ester, carboxylic acid and sulfuric acid.

Another problem in the separation of the product arises from the fact that the esters often boil close to or above the boiling points of the carboxylic acids in the mixture. This tends to make the ester separation difficult or expensive, or both. Fractional distillation of the reaction mixture does not satisfactorily separate sec-butyl acetate B. P. 112° C. from acetic acid B. P. 118° C. because of the closeness of their boiling points. Addition of sufficient water to the reaction mixture to form a 2-layer system causes some separation of acetic acid from sec-butyl acetate, but the acetic acid and sulfuric acid catalyst are thereby diluted with water and must be reconcentrated before being recycled to the reaction unit.

This invention provides a method for overcoming the beforementioned difficulties. The method comprises, among other things, adding a small amount of water and excess carboxylic acid to an esterification mixture comprising principally ester, carboxylic acid, and sulfuric acid, and conducting the ester distillation in the presence of these two added components. The water azeotropes overhead with the ester and by reducing the boiling point of the latter facilitates its separation. A bottoms product from the distillation comprising principally carboxylic acid and relatively anhydrous sulfuric acid is available for recycling to the esterification zone.

The amount of water added is about the quantity sufficient to azeotrope out all the ester formed. Typical azeotrope compositions with their boiling points are as follows:

|  | B. P. of ester, ° C. | B. P. of water azeotrope, ° C. | Percent by wt. of water |
|---|---|---|---|
| Ethyl acetate | 77.1 | 70.4 | 6.1 |
| Isopropyl acetate | 91.0 | 77.4 | 6.2 |
| Ethyl propionate | 99.15 | 81.2 | 10 |
| sec-Butyl acetate | 112 | 86.6 | 19.4 |
| Ethyl butyrate | 121.6 | 87.9 | 21.5 |
| sec-Amyl acetate | 133 | 92 | 32.2 |

While excess water can be azeotroped out by recycle of ester, this is costly, and it is definitely preferable not to utilize excess water.

The excess carboxylic acid can be added before the reaction with the olefin or after reaction, but in any case should be present during the distillation of the ester. The quantity utilized is approximately that sufficient to replace the carboxylic acid used up in the esterification process. For example, where the mol ratio of acetic acid to olefin is 1/1 and the yield of ester is 54 mol per cent, an addition of 0.54 mol of acetic acid per mol of acetic acid originally present would be made. If 10 wt. per cent sulfuric acid based on acetic acid was used as a catalyst, the sulfuric concentration at the end of the reaction would be 20 wt. per cent, since approximately half of the acetic acid was converted to ester. Addition of 0.54 mol acetic acid would restore the wt. per cent value of the sulfuric acid to 10 wt. per cent, and thus make it a more satisfactory solution from which to distill the ester.

A mixture of carboxylic acid and water could be utilized with a concentration of each so chosen as to conform to the preceding requirements.

By the term "relatively anhydrous sulfuric acid" it is meant sulfuric acid having a minimum concentration of about 75 wt. per cent on an organic-free basis so as to be usable as a catalyst in the esterification reaction, i. e., does not contain excessive water which would destroy its catalytic efficiency.

The two added components, i. e., water and carboxylic acid, cooperate in a surprising manner to facilitate ester separation. The addition of water by favoring ester azeotrope formation reduces the boiling point of ester to make it more easily separable. It would be expected, however, that the addition of water to a system containing as much as 10. wt. percent concentrated sulfuric acid would result in severe process difficulties and a wet sulfuric acid not suitable for use in esterification. The minimum concentration of sulfuric acid itself that can be utilized as a catalyst is about 65 wt. percent. Actually, however, the carboxylic acid added, in addition to preventing ester decomposition, aids in the displacement of the water from the sulfuric acid to the ester azeotrope at temperatures utilized, preferably below 100° C. The carboxylic acid also contributes to the preventing of excessive temperature rise during the distillation. The carboxylic acid-sulfuric acid mixture is left as a residue from the distillation in a form suitable for recycling to esterification. Sulfuric acid of 96% concentration is obtained even in the presence of this added water, a truly surprising result. The significance of this is illustrated by the fact that a decrease in effective sulfuric acid concentration from 80 to 60% (on an organic-free basis) decreases the yield of secondary butyl acetate from n-butylenes and acetic acid from 56 to 11 mol percent.

The olefins which can be used in the esterification reaction include $C_2$ to $C_6$ monoolefins, i. e., ethylene, propylene, 1-butene, 2-butene, 1-pentene, isopentene, 2-pentene, 1-hexene, isohexene, 2-hexene, as well as isoprene, butadiene, and styrene or mixtures thereof. There is no exact limit to the molecular weight or number of carbon atoms in the olefin used.

The acids which can be used for esterification by the olefins include a wide variety of $C_1$ to $C_8$ aliphatic monobasic acids. Acids which may be used include formic acid, acetic acid, propionic acid, butyric acid, isobutyric acid, valeric acid, caproic acid, capric acid.

As a general rule, it is best to use this improved ester separation process for esters having from 3 to 12 carbon atoms and which form water azeotropes which distill below the temperatures of the acids utilized.

This process is especially adapted for use in the separation of secondary butyl acetate, which is normally separable from the indicated mixtures only with extreme difficulty.

The olefin esterification reaction mixtures separated comprise principally, as explained above, carboxylic acid, ester, and sulfuric acid, and are thus largely independent of the esterification variables themselves. Since the latter are well known and constitute no part of this invention, they need not be elaborated upon here.

This invention will be better understood by reference to the flow diagram shown in the drawing. The description deals with secondary butyl acetate prepared from normal butylenes and acetic acid utilizing sulfuric acid as the catalyst.

In the system shown a hydrocarbon stream consisting of normal butylenes admixed with butanes and smaller amounts of $C_3$ and $C_5$ hydrocarbons enters esterification zone 1 through line 2. Acetic acid admixed with sulfuric acid of 70–100% strength on an organic-free basis enters esterification zone 1 through line 3. A countercurrent contacting is thereby obtained. The temperature is maintained between 70° and 160° C., and a pressure of from 80 to 700 p. s. i. The reaction mixture comprising principally secondary butyl acetate, acetic acid, sulfuric acid, and unconverted hydrocarbons, is withdrawn from the esterification zone 1 through line 4 to flash drum 5. The unconverted hydrocarbons, principally $C_4$'s, are taken overhead through line 6. The residual mixture taken off from flash drum 5 comprises principally acetic acid, secondary butyl acetate, and sulfuric acid, and is fed from line 7 to distillation tower 8. Acetic acid and water are added to the distillation tower 8 through line 9, although these may be fed in separately. Sufficient water is added to make up the secondary butyl acetate-water azeotrope, which has a boiling point of 87° C. and a composition of 19.4 wt. percent water and 80.6 wt. percent ester. The acetic acid is added in an amount sufficient to make up the acid utilized in the esterification reaction mixture, e. g., 0.45 mol of acetic acid. The secondary butyl acetate-water azeotrope is taken overhead through line 10 to separation drum 11, where the azeotrope breaks into two phases, an upper ester phase and a lower water phase. The purified ester product is withdrawn through line 12. The water can be discarded or utilized for volatilizing more ester. The bottoms from the distillation, consisting largely of acetic acid and sulfuric acid of over 75% on an organic-free basis and some ester, is returned through line 13 into line 3 to esterification zone 1.

Makeup components can be added as needed. The ester is further worked up, if desired, by conventional processes.

The following examples provide additional details of the process and highlight its advantages:

Example I

A reaction mixture comprising 25 mols of acetic acid, 5 mols of sulfuric acid, and 15 mols of isopropyl acetate had admixed 10 mols of water and 18 mols of acetic acid. The mixture was distilled in a continuous column at a 10/3 reflux ratio at a feed rate of 600 cc./hour with a still head temperature of 77° C. 63% of the ester was recovered as overhead, with less than 8% decomposed to propylene. Sulfuric acid obtained in the bottoms was 85% sulfuric acid on an organic-free basis. A batch distillation of a similar mixture in which the sulfuric acid was 31% on an organic-free basis gave a 96% sulfuric acid in the residue. Six per cent of the isopropyl acetate was converted to propylene.

These examples illustrate how the sulfuric acid in the presence of acetic acid and water was dried by the azeotropic distillation which at the same time yielded good separations of the desired product.

Example II

A mixture of 200 g. of secondary butyl acetate, 34.2 g. of acetic acid, 6 g. of sulfuric acid, and 12.3 g. of water was distilled through a 20-plate Oldershaw column. 80% of the secondary butyl acetate and 96.5% of acetic acid was recovered. The sulfuric acid bottoms was 96% on an organic-free basis, again pointing out how the dry sulfuric acid was obtained in the presence of water and acetic acid.

This process has particular advantages in the production of sec-butyl acetate. Sec-butyl acetate must be separated from acetic acid at some stage by azeotropic distillation with water. There is no other way excepting an expensive chemical treatment which means additional expense in the ultimate recovery of the acetic acid. The discovery that sulfuric acid in the presence of added acetic acid can be recovered dry by an azeotropic distillation makes it possible to separate ester not only from sulfuric acid but also from acetic acid in one operation.

The process also has value when any ester so prepared from an olefin has a boiling point such that the ester may be azeotroped from the reaction mixture satisfactorily with water. For example, an ester distilling at 200° C. could not be removed by distillation from a mixture of sulfuric and acetic acid without first distilling the acetic acid. However, addition of water would allow the ester to be removed at some temperature below 100° C. leaving the acetic acid and relatively dry sulfuric acid behind.

It will be understood further that the foregoing examples and apparatus have been given merely for purposes of illustration, but that other modifications of the present invention are possible without departing from the scope of the appended claims.

What is claimed is:

1. In a continuous process for separating an ester from a reaction mixture produced in an esterification step by reaction of a $C_2$ to $C_6$ monoolefin with a $C_1$ to $C_8$ aliphatic monocarboxylic acid in the presence of about 5 to 10 weight percent of relatively anhydrous sulfuric acid based on the monocarboxylic acid, said ester being one capable of forming a water azeotrope which distills below the temperature of the monocarboxylic acid used, the improvement which comprises withdrawing the reaction mixture from the esterification step, discharging unconverted olefin from the withdrawn mixture, providing an excess of the free monocarboxylic acid in the resulting olefin-free mixture, adding to said olefin-free mixture a quantity of water about sufficient to form a water azeotrope with all the ester formed, heating the resulting aqueous mixture in a distillation zone, withdrawing an ester-water azeotrope as a distillate fraction from said distillation zone, also withdrawing from said distillation zone a bottoms fraction containing the free monocarboxylic acid and relatively anhydrous sulfuric acid, recycling said bottoms fraction to the esterification step, and separating the distillate fraction into an aqueous phase and an organic ester phase.

2. In a continuous process for separating secondary butyl acetate from a reaction mixture produced in an esterification step by reaction of a normal butylene with acetic acid in the presence of about 5 to 10 weight percent of sulfuric acid having a minimum concentration of about 75 weight percent on an organic-free basis, the improvement which comprises continuously withdrawing the reaction mixture from the esterification step, continuously flashing unconverted butylene from the withdrawn mixture, continuously adding to the reaction mixture a further quantity of acetic acid in an amount approximately sufficient to replace the acetic acid used up in the esterification step, also continuously adding to the withdrawn mixture a quantity of water about sufficient to form a water azeotrope with all the ester formed, continuously heating the resulting aqueous mixture in a distillation zone, continuously withdrawing an ester-water azeotrope as a distillate fraction from said distillation zone, also continuously withdrawing from said distillation zone a bottoms fraction containing the acetic acid and sulfuric acid having a minimum concentration of 75 weight percent on an organic-free basis, recycling said bottoms fraction to the esterification step, and separating the azeotropic distillate into an aqueous phase and an organic ester phase.

References Cited in the file of this patent

UNITED STATES PATENTS

| | | |
|---|---|---|
| 1,898,737 | Merley | Feb. 21, 1933 |
| 1,926,189 | Ayres | Sept. 12, 1933 |
| 2,006,734 | Edlund et al. | July 2, 1935 |
| 2,079,652 | Davis et al. | May 11, 1937 |
| 2,438,300 | Schniepp | Mar. 23, 1948 |